(12) United States Patent
Wang et al.

(10) Patent No.: US 12,151,562 B2
(45) Date of Patent: Nov. 26, 2024

(54) VEHICLE TORQUE PROCESSING METHOD AND APPARATUS, VEHICLE CONTROLLER, AND VEHICLE

(71) Applicant: HUAWEI TECHNOLOGIES CO.,LTD., Guangdong (CN)

(72) Inventors: Yibo Wang, Shanghai (CN); Xiaopeng Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 467 days.

(21) Appl. No.: 17/489,765

(22) Filed: Sep. 29, 2021

(65) Prior Publication Data

US 2022/0016985 A1 Jan. 20, 2022

Related U.S. Application Data

(63) Continuation of application No. PCT/CN2020/083711, filed on Apr. 8, 2020.

(30) Foreign Application Priority Data

Apr. 8, 2019 (CN) .......................... 201910277149.7

(51) Int. Cl.
*B60L 15/20* (2006.01)
*B60W 30/20* (2006.01)

(52) U.S. Cl.
CPC ......... *B60L 15/2036* (2013.01); *B60W 30/20* (2013.01); *B60L 2240/12* (2013.01); *B60L 2240/14* (2013.01); *B60L 2240/22* (2013.01); *B60L 2240/423* (2013.01); *B60W 2720/403* (2013.01)

(58) Field of Classification Search
None
See application file for complete search history.

(56) References Cited

U.S. PATENT DOCUMENTS

| 9,469,199 B1 | 10/2016 | Gauthier |
| 9,744,879 B2 | 8/2017 | Drako |
| 9,937,915 B2 * | 4/2018 | Sato ..................... B60W 20/15 |

(Continued)

FOREIGN PATENT DOCUMENTS

| CN | 101457698 A | 6/2009 |
| CN | 102910170 A | 2/2013 |

(Continued)

*Primary Examiner* — Todd Melton
(74) *Attorney, Agent, or Firm* — HUAWEI TECHNOLOGIES CO., LTD.

(57) ABSTRACT

A vehicle torque processing method, apparatus, and a vehicle controller are provided. The method includes allocating torque to the first power drive system and a second power drive system based on required torque, where a sum of first torque output by the first power drive system and second torque output by the second power drive system is equal to the required torque. At a current vehicle speed, if an intrinsic frequency of the first power drive system is a frequency in a resonance frequency range corresponding to the first power drive system, based on the required torque and peak torque of the second power drive system, the torque output by the first power drive system and the torque output by the second power drive system are adjusted.

11 Claims, 5 Drawing Sheets

(56) References Cited

U.S. PATENT DOCUMENTS

| | | | |
|---|---|---|---|
| 11,007,878 B2 * | 5/2021 | Kamino | B60L 50/51 |
| 11,192,556 B2 * | 12/2021 | Suzuki | B60K 17/354 |
| 2012/0016549 A1 | 1/2012 | Katsumata et al. | |
| 2016/0236589 A1 | 8/2016 | Sikand et al. | |
| 2018/0265097 A1 | 9/2018 | Suzuki et al. | |

FOREIGN PATENT DOCUMENTS

| | | |
|---|---|---|
| CN | 103717431 A | 4/2014 |
| CN | 104590050 A | 5/2015 |
| CN | 104786804 A | 7/2015 |
| CN | 104875742 A | 9/2015 |
| CN | 105083280 A | 11/2015 |
| CN | 204821554 U | 12/2015 |
| CN | 105818677 A | 8/2016 |
| CN | 106240402 A | 12/2016 |
| CN | 106515509 A | 3/2017 |
| CN | 106627091 A | 5/2017 |
| CN | 106864307 A | 6/2017 |
| CN | 107161032 A | 9/2017 |
| CN | 108068659 A | 5/2018 |
| CN | 108749647 A | 11/2018 |
| CN | 109462358 A | 3/2019 |
| CN | 109466536 A | 3/2019 |
| DE | 102008035556 A1 | 2/2010 |
| JP | 2001112113 A | 4/2001 |
| JP | 2001171378 A | 6/2001 |
| JP | 2002078110 A | 3/2002 |
| JP | 2007037217 A | 2/2007 |
| JP | 2007125998 A | 5/2007 |
| JP | 2009143318 A | 7/2009 |
| JP | 2016137809 A | 8/2016 |
| JP | 2018033290 A | 3/2018 |
| WO | 2013021724 A1 | 2/2013 |
| WO | 2014061083 A1 | 4/2014 |

* cited by examiner

VEHICLE TORQUE PROCESSING METHOD AND APPARATUS, VEHICLE CONTROLLER, AND VEHICLE

CROSS-REFERENCE TO RELATED APPLICATIONS

This application is a continuation of International Patent Application No. PCT/CN2020/083711 filed on Apr. 8, 2020, which claims priority to Chinese Patent Application No. 201910277149.7, filed on Apr. 8, 2019. The disclosures of the aforementioned applications are hereby incorporated by reference in their entireties.

TECHNICAL FIELD

Embodiments of this application relate to computer technologies, and in particular, to a vehicle torque processing method and apparatus, a vehicle controller, and a vehicle.

BACKGROUND

With continuous developing of people's awareness of environmental protection, new energy vehicles, electric vehicles, and the like with advantages of energy saving and environmental protection are increasingly favored by people, and therefore enter a stage of buoyant development. A four-wheel drive new energy vehicle has an independent front power drive system and an independent rear power drive system to flexibly allocate torque required by a driver, so as to easily implement shift among independent front-wheel drive, independent rear-wheel drive, and four-wheel drive, and therefore has better power performance and control performance. However, the power drive systems of the four-wheel drive new energy vehicle may generate unbearable high-frequency electromagnetic noise during operation, and the power drive systems of the four-wheel drive new energy vehicle may also generate vibration. The vibration and the noise generated by the power drive systems have great impact on smooth-going of the four-wheel drive new energy vehicle. Therefore, how to reduce the vibration and the noise of the power drive systems of the four-wheel drive new energy vehicle as much as possible is a problem that needs to be resolved.

In the conventional technology, a method is proposed in which an independent vibration damping mechanism is added to a hybrid electric vehicle, and the vibration damping mechanism is made of a damping material to attenuate high-frequency vibration of a power drive system, so as to reduce a resonance problem caused by the high-frequency vibration.

However, the method in the conventional technology may lead to excessively high system complexity and an excessively large system volume.

SUMMARY

Embodiments of this application provide a vehicle torque processing method and apparatus, a vehicle controller, and a vehicle, to reduce vibration and noise of the vehicle without increasing system complexity or a system volume.

According to a first aspect, an embodiment of this application provides a vehicle torque processing method. In this method, torque is first allocated to a first power drive system and a second power drive system of a vehicle based on current required torque of the vehicle, and a sum of first torque output by the first power drive system and second torque output by the second power drive system is equal to the required torque. At a current vehicle speed, if an intrinsic frequency of the first power drive system is a frequency in a resonance frequency range corresponding to the first power drive system, it indicates that the first power drive system resonates. In this case, the torque output by the first power drive system and the torque output by the second power drive system are adjusted based on the required torque and peak torque of the second power drive system. After modification, torque output by the first power drive system is third torque, torque output by the second power drive system is fourth torque, the fourth torque is less than or equal to the peak torque of the second power drive system, the third torque is less than the first torque, and the fourth torque is greater than the second torque.

In this method, a problem that vibration or noise of the vehicle affects smooth-going of the vehicle can be resolved by only optimizing torque allocation of the vehicle, without increasing any hardware cost, increasing system complexity, or occupying space of the vehicle. At the same time, inputs of vibration and noise suppression devices, such as a sound-absorbing coating material and suspension bushing, for the whole vehicle can be reduced, and a weight and a volume of the whole vehicle can be reduced. In addition, when it is determined that the first power drive system resonates, the torque of the first power drive system and the torque of the second power drive system are adjusted based on the current required torque and the peak torque of the second power drive system, so that the torque of the first power drive system becomes smaller. Because the peak torque of the second power drive system is involved, when the required torque is met, the torque allocated to the first power drive system can be minimized, so that the vibration and the noise of the first power drive system that resonates are significantly reduced, thereby ensuring the smooth-going of the vehicle.

In a possible implementation, after the first torque is allocated to the first power drive system and the second torque is allocated to the second power drive system, at the current vehicle speed and under the first torque currently allocated to the first power drive system, if it is determined that a vibration value of the first power drive system is greater than a first preset threshold or a noise value of the first power drive system is greater than a second preset threshold, it indicates that the first power drive system is currently in an NVH bad zone. In this case, the torque output by the first power drive system and the torque output by the second power drive system may be adjusted. After adjustment, torque output by the first power drive system is fifth torque, torque output by the second power drive system is sixth torque, the fifth torque is torque in at least one first available torque range, the sixth torque is torque in at least one second available torque range, and the fifth torque is less than the first torque.

The first available torque range is an available range of the first power drive system, and the second available torque range is an available range of the second power drive system.

At the current vehicle speed and under any torque in the first available torque range, the vibration value of the first power drive system is less than or equal to the first preset threshold, and the noise value of the first power drive system is less than or equal to the second preset threshold.

At the current vehicle speed and under any torque in the second available torque range, a vibration value of the second power drive system is less than or equal to the first preset threshold, and a noise value of the second power drive system is less than or equal to the second preset threshold.

In the foregoing implementation, when the first power drive system is in the NVH bad zone, the torque of the first power drive system is adjusted based on the first available torque range, and the torque of the second power drive system is adjusted based on the second available torque range. After the allocated torque is adjusted based on the two available torque ranges, NVH bad zones of the first power drive system and the second power drive system both can be avoided, to ensure the smooth-going of the vehicle.

In a possible implementation, when the first power drive system is in the NVH bad zone, the fifth torque output by the first power drive system is torque that is in the at least one first available torque range and that has a smallest difference from the first torque, and the sixth torque output by the second power drive system is torque that is in the at least one second available torque range and that has a smallest difference from the second torque.

In this manner, an adjustment variation of the torque can be minimum when the smooth-going of the vehicle is ensured, to improve processing efficiency and stability of the systems of the vehicle.

In a possible implementation, when the first power drive system resonates, if the required torque is less than the peak torque of the second power drive system, the third torque output by the first power drive system is equal to zero, and the fourth torque output by the second power drive system is equal to the required torque.

In this manner, when the first power drive system resonates, the torque allocated to the first power drive system can be minimized without affecting the second power drive system, to quickly eliminate a resonance phenomenon of the first power drive system.

In a possible implementation, when the first power drive system resonates, if the required torque is greater than or equal to the peak torque of the second power drive system, the fourth torque output by the second power drive system is equal to the peak torque of the second power drive system, and the third torque output by the first power drive system is equal to a difference obtained by subtracting the peak torque from the required torque.

In this manner, when the first power drive system resonates, the torque allocated to the first power drive system can be minimized without affecting the second power drive system, to quickly eliminate a resonance phenomenon of the first power drive system.

In a possible implementation, the intrinsic frequency of the first power drive system may be further determined based on a current rotational speed corresponding to the current vehicle speed and a preset eigenvalue coefficient of the first power drive system.

In a possible implementation, the method further includes:
if a difference between an actual yawing angular velocity and a target yawing angular velocity is greater than or equal to a third preset threshold, adjusting, based on the current required torque, the third torque output by the first power drive system and the fourth torque output by the second power drive system, so that under seventh torque output by the first power drive system and eighth torque output by the second power drive system, a difference between an actual yawing angular velocity and a target yawing angular velocity is less than the third preset threshold.

In this implementation, if the difference between the actual yawing angular velocity and the target yawing angular velocity is greater than or equal to the third preset threshold, it indicates that the vehicle is in an oversteer state or an understeer state. The torque output by the first power drive system and the torque output by the second power drive system are adjusted, so that a case of oversteer or understeer of the vehicle can be avoided, and running safety of the vehicle can be improved.

According to a second aspect, an embodiment of this application provides a vehicle torque processing method. In this method, torque is first allocated to a first power drive system and a second power drive system of a vehicle based on current required torque of the vehicle, and a sum of first torque output by the first power drive system and second torque output by the second power drive system is equal to the required torque. At a current vehicle speed and under the first torque currently output by the first power drive system, if a vibration value of the first power drive system is greater than a first preset threshold or a noise value of the first power drive system is greater than a second preset threshold, it indicates that the first power drive system is currently in an NVH bad zone. In this case, the torque output by the first power drive system and the torque output by the second power drive system may be adjusted. After adjustment, torque output by the first power drive system is fifth torque, torque output by the second power drive system is sixth torque, the fifth torque is torque in at least one first available torque range, the sixth torque is torque in at least one second available torque range, and the fifth torque is less than the first torque.

The first available torque range is an available range of the first power drive system, and the second available torque range is an available range of the second power drive system.

At the current vehicle speed and under any torque that is in the first available torque range and that is output by the first power drive system, the vibration value of the first power drive system is less than or equal to the first preset threshold, and the noise value of the first power drive system is less than or equal to the second preset threshold.

At the current vehicle speed and under any torque that is in the second available torque range and that is output by the second power drive system, a vibration value of the second power drive system is less than or equal to the first preset threshold, and a noise value of the second power drive system is less than or equal to the second preset threshold.

In this method, when the first power drive system is in the NVH bad zone, the torque of the first power drive system is adjusted based on the first available torque range, and the torque of the second power drive system is adjusted based on the second available torque range. After the allocated torque is adjusted based on the two available torque ranges, NVH bad zones of the first power drive system and the second power drive system both can be avoided, to ensure smooth-going of the vehicle.

In a possible implementation, when the first power drive system is in the NVH bad zone, the fifth torque output by the first power drive system is torque that is in the at least one first available torque range and that has a smallest difference from the first torque, and the sixth torque output by the second power drive system is torque that is in the at least one second available torque range and that has a smallest difference from the second torque.

In this manner, an adjustment variation of the torque can be minimum when the smooth-going of the vehicle is ensured, to improve processing efficiency and stability of the systems of the vehicle.

In a possible implementation, the method further includes:

if a difference between an actual yawing angular velocity and a target yawing angular velocity is greater than or equal to a third preset threshold, adjusting, based on the current required torque, the fifth torque output by the first power drive system and the sixth torque output by the second power drive system, so that under seventh torque output by the first power drive system and eighth torque output by the second power drive system, a difference between an actual yawing angular velocity and a target yawing angular velocity is less than the third preset threshold.

In this implementation, if the difference between the actual yawing angular velocity and the target yawing angular velocity is greater than or equal to the third preset threshold, it indicates that the vehicle is in an oversteer state or an understeer state. The torque output by the first power drive system and the torque output by the second power drive system are adjusted, so that a case of oversteer or understeer of the vehicle can be avoided, and running safety of the vehicle can be improved.

According to a third aspect, an embodiment of this application provides a vehicle torque processing apparatus. The apparatus includes an allocation module and a processing module.

The allocation module is configured to allocate torque to a first power drive system and a second power drive system based on required torque, where a sum of first torque output by the first power drive system and second torque output by the second power drive system is equal to the required torque.

The processing module is configured to: at a current vehicle speed, when an intrinsic frequency of the first power drive system is a frequency in a resonance frequency range corresponding to the first power drive system, adjust, based on the required torque and peak torque of the second power drive system, the torque output by the first power drive system and the torque output by the second power drive system, where after adjustment, torque output by the first power drive system is third torque, torque output by the second power drive system is fourth torque, the fourth torque is less than or equal to the peak torque of the second power drive system, the third torque is less than the first torque, and the fourth torque is greater than the second torque.

In a possible implementation, a sum of the third torque and the fourth torque is less than or equal to the required torque.

In a possible implementation, the processing module is configured to:

when the required torque is less than the peak torque of the second power drive system, the third torque output by the first power drive system is equal to zero, and the fourth torque output by the second power drive system is equal to the required torque.

In a possible implementation, the processing module is configured to:

when the required torque is greater than or equal to the peak torque of the second power drive system, the fourth torque output by the second power drive system is equal to the peak torque of the second power drive system, and the third torque output by the first power drive system is equal to a difference obtained by subtracting the peak torque from the required torque.

In a possible implementation, the processing module is further configured to:

determine the intrinsic frequency of the first power drive system based on a current rotational speed corresponding to the current vehicle speed and a preset eigenvalue coefficient of the first power drive system.

In a possible implementation, the processing module is further configured to:

when a difference between an actual yawing angular velocity and a target yawing angular velocity is greater than or equal to a third preset threshold, adjust, based on current required torque, the third torque output by the first power drive system and the fourth torque output by the second power drive system, so that under seventh torque output by the first power drive system and eighth torque output by the second power drive system, a difference between an actual yawing angular velocity and a target yawing angular velocity is less than the third preset threshold.

For beneficial effects of the vehicle torque processing apparatus provided in the third aspect and the possible implementations of the third aspect, refer to beneficial effects brought by the first aspect and the possible implementations of the first aspect. Details are not described herein again.

According to a fourth aspect, an embodiment of this application provides a vehicle torque processing apparatus. The apparatus includes an allocation module and a processing module.

The allocation module is configured to allocate torque to a first power drive system and a second power drive system based on required torque, where a sum of first torque output by the first power drive system and second torque output by the second power drive system is equal to the required torque.

The processing module is configured to: at a current vehicle speed and under the first torque currently allocated to the first power drive system, when a vibration value of the first power drive system is greater than a first preset threshold or a noise value of the first power drive system is greater than a second preset threshold, adjust, based on at least one available torque range, the torque output by the first power drive system and the torque output by the second power drive system, where after adjustment, torque output by the first power drive system is fifth torque, torque output by the second power drive system is sixth torque, the fifth torque is torque in at least one first available torque range, the sixth torque is torque in at least one second available torque range, and the fifth torque is less than the first torque.

The first available torque range is an available range of the first power drive system, and the second available torque range is an available range of the second power drive system.

At the current vehicle speed and under any torque that is in the first available torque range and that is output by the first power drive system, the vibration value of the first power drive system is less than or equal to the first preset threshold, and the noise value of the first power drive system is less than or equal to the second preset threshold.

At the current vehicle speed and under any torque that is in the second available torque range and that is output by the second power drive system, a vibration value of the second power drive system is less than or equal to the first preset threshold, and a noise value of the second power drive system is less than or equal to the second preset threshold.

In a possible implementation, a sum of the fifth torque and the sixth torque is less than or equal to the required torque.

In a possible implementation, the fifth torque is torque that is in the at least one first available torque range and that has a smallest difference from the first torque, and the sixth torque is torque that is in the at least one second available torque range and that has a smallest difference from the second torque.

In a possible implementation, the processing module is further configured to:

when a difference between an actual yawing angular velocity and a target yawing angular velocity is greater than or equal to a third preset threshold, adjust, based on current required torque, the fifth torque output by the first power drive system and the sixth torque output by the second power drive system, so that under seventh torque output by the first power drive system and eighth torque output by the second power drive system, a difference between an actual yawing angular velocity and a target yawing angular velocity is less than the third preset threshold.

For beneficial effects of the vehicle torque processing apparatus provided in the fourth aspect and the possible implementations of the fourth aspect, refer to beneficial effects brought by the second aspect and the possible implementations of the second aspect. Details are not described herein again.

According to a fifth aspect, an embodiment of this application provides a vehicle controller. The vehicle controller includes a processor and a memory.

The memory is configured to store program code that can be executed and information that can be invoked by the processor, and the processor is configured to execute the program code in the memory and invoke the information in the memory, to implement the method provided in the first aspect, each possible implementation of the first aspect, the second aspect, or each possible implementation of the second aspect.

According to a sixth aspect, an embodiment of this application provides a vehicle, including a first power drive system, a second power drive system, and the vehicle controller according to the fifth aspect.

According to a seventh aspect, an embodiment of this application provides a computer program product including instructions. When the computer program product runs on a computer, the computer is enabled to perform the method provided in the first aspect, each possible implementation of the first aspect, the second aspect, or each possible implementation of the second aspect.

According to an eighth aspect, an embodiment of this application provides a computer-readable storage medium. The computer-readable storage medium stores instructions. When the instructions are run on a computer, the computer is enabled to perform the method provided in the first aspect, each possible implementation of the first aspect, the second aspect, or each possible implementation of the second aspect.

According to a ninth aspect, an embodiment of this application provides a chip. The chip is connected to a memory, and is configured to read and execute a software program stored in the memory, to implement the method provided in the first aspect, each possible implementation of the first aspect, the second aspect, or each possible implementation of the second aspect.

According to a tenth aspect, an embodiment of this application provides a chip. The chip includes a processor and a memory, and the processor is configured to read a software program stored in the memory, to implement the method provided in the first aspect, each possible implementation of the first aspect, the second aspect, or each possible implementation of the second aspect.

DESCRIPTION OF EMBODIMENTS

Figure 1:
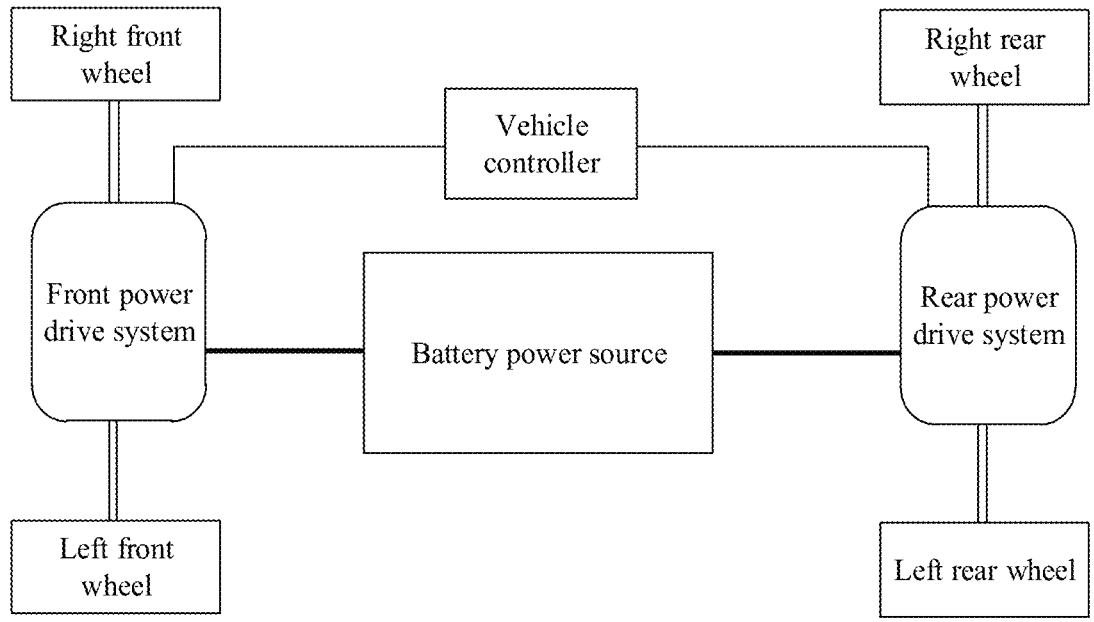
FIG. 1 is a schematic diagram of a system architecture of a four-wheel drive new energy vehicle.

A method in the embodiments of this application can be applied to a vehicle having more than one power drive system, for example, a four-wheel drive new energy vehicle or an electric vehicle. FIG. 1 is a schematic diagram of a system architecture of a four-wheel drive new energy vehicle. As shown in FIG. 1, the four-wheel drive new energy vehicle has a front power drive system and a rear power drive system. The two power drive systems are independent of each other, and are both powered by a battery power source. A vehicle controller in the four-wheel drive new energy vehicle performs unified control, and allocates output torque to front and rear wheels according to a proportion, so as to flexibly allocate torque required by a driver, so that the new energy vehicle possesses better power performance and handling stability.

It should be noted that the embodiments of this application are not only applicable to the four-wheel drive new energy vehicle, but also applicable to another vehicle that has more than one power drive system and whose power drive systems are independent of each other.

To make a person skilled in the art better understand the solutions of this application, the following first explains and describes technical terms used in the embodiments of this application.

1. Power Drive System

A power drive system in the embodiments of this application is a series of parts and components that generate power on a vehicle and transmit the power to a road surface. For a new energy vehicle, the power drive system may include a traction motor, a motor controller, a reducer, an attached mechanical transmission device, and the like.

In the embodiments of this application, the power drive system may be a centralized power drive system, or may be a distributed power drive system. This is not limited in the embodiments of this application.

2. Resonance

Resonance is a tendency of a physical system to absorb more energy from a surrounding environment when it vibrates at a natural frequency of the physical system. When the resonance occurs, an amplitude of the physical system may reach a very large value, and therefore cause severe vibration and noise.

3. Resonance Frequency

A frequency value corresponding to a physical system when the physical system resonates. At a resonance frequency, very small periodic driving force can generate large vibration.

4. Resonance Frequency Range

There may be a plurality of frequencies at which a physical system resonates, and these frequencies may form a resonance frequency range.

5. Smooth-Going

Smooth-going refers to performance of ensuring that an occupant does not feel uncomfortable and tired due to vibration of a vehicle body and keeping goods transported by a vehicle intact when the vehicle runs within a normal speed range. The smooth-going may also be referred to as ride comfort.

6. Handling Stability

Handling stability, that is, stability of handling, refers to performance that a vehicle can be controlled by a driver by using a steering system to run in a given direction when the driver does not feel excessively tense and tired, and the vehicle can resist interference and keep running stably when the vehicle is subject to external interference, for example, road bumpiness, side wind, or unbalance loading of goods or occupants.

7. NVH Bad Zone

NVH is a comprehensive indicator that indicates vibration and noise features, where N indicates noise (Noise), V indicates vibration (Vibration), and H indicates harshness (Harshness). An NVH feature of a power drive system (hereinafter referred to as a "system") includes a resonance frequency range of the system and noise distribution of the system. The noise distribution of the system refers to distribution of vibration and noise characteristics of the system with respect to a rotational speed and torque. In the embodiments of this application, different power drive systems have different NVH characteristics. The different NVH characteristics mean that the different power drive systems have different resonance frequency ranges, and do not simultaneously generate a resonance phenomenon at a same rotational speed; and the different power drive systems have different vibration and noise distribution, and have different vibration and noise performance at a same rotational speed and under same torque.

Regarding a power drive system, an NVH bad zone of the power drive system is an operating area in which the power drive system generates unacceptable vibration or noise. It can be determined that an operating condition is in the NVH bad zone of the power drive system if a vibration value or a noise value of the power drive system reaches a specific threshold when it running under a rotational speed and a torque.

A specific method for determining the NVH bad zone is described in detail in the following embodiments.

The following describes in detail the technical solutions of the embodiments of this application with reference to specific embodiments. The following several specific embodiments may be combined with each other, and a same or similar concept or process may not be described repeatedly in some embodiments.

As described above, the method in the embodiments of this application may be applied to a vehicle having more than one power drive system. For ease of describing the solutions in the embodiments of this application, a "first power drive system" and a "second power drive system" are used below in the embodiments of this application to distinguish between these power drive systems. However, it should be noted that the names are merely used to distinguish between different power drive systems, and should not be used as a limitation on the power drive systems. For example, when the method in the embodiments of this application is applied to a new energy vehicle having a front power drive system and a rear power drive system, the "first power drive system" may refer to the front power drive system, or may refer to the rear power drive system. In addition, the "second power drive system" may refer to the rear power drive system, or may refer to the front power drive system. In the embodiments of this application, the first power drive system is one of the front power drive system and the rear power drive system, and the second power drive system is the other power drive system.

For ease of description, in the embodiments of this application, the vehicle having more than one power drive system is collectively referred to as a "vehicle" below.

Figure 2:
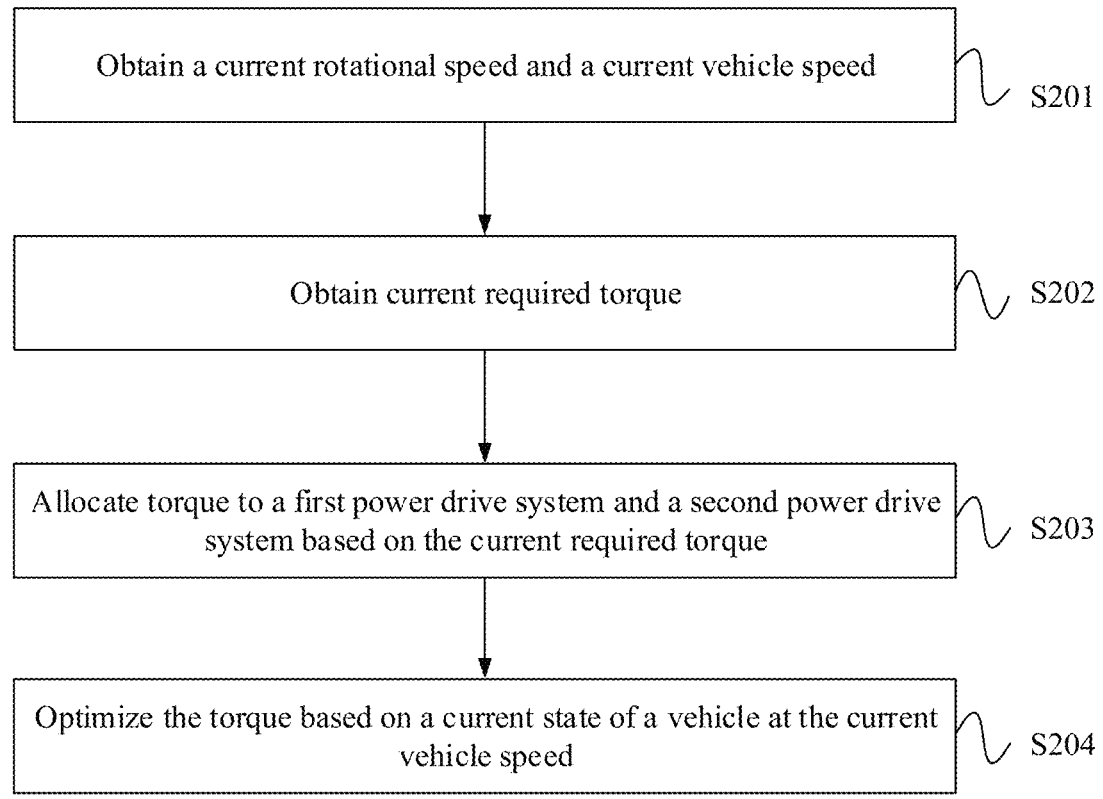
FIG. 2 is a schematic flowchart of a vehicle torque processing method according to an embodiment of this application.

FIG. 2 is a schematic flowchart of a vehicle torque processing method according to an embodiment of this application. The method is performed by the foregoing vehicle, and may be performed by a vehicle controller of the vehicle. As shown in FIG. 2, the method includes the following steps.

S201: Obtain a current rotational speed and a current vehicle speed.

For vehicles of a same model, there exists a fixed proportional relationship between a vehicle speed and an engine (motor) rotational speed (hereinafter referred to as a "rotational speed"). In an optional implementation, when a vehicle is running, the vehicle controller of the vehicle can receive a real-time rotational speed from a rotational speed sensor in a power drive system, and then a real-time vehicle speed of the vehicle can be obtained based on the rotational speed and the foregoing fixed proportional relationship.

S202: Obtain current required torque.

Torque refers to a moment output by an engine (motor) from a crankshaft end. At constant power, the torque is inversely proportional to the engine rotational speed.

In an embodiment of this application, the required torque may be considered as torque that can reflect an instruction sent by a vehicle driver by operating the vehicle. For example, the driver may operate an accelerator pedal or a brake pedal, or perform gear shifting, steering, or the like, so that a running status of the vehicle meets a requirement of the driver.

In an optional manner, the vehicle controller of the vehicle may collect an accelerator pedal signal, a brake pedal signal, a gear shifting position signal, and a steering angle signal, and calculate a current torque requirement of the driver for the vehicle based on these signals.

S203: Allocate torque to the first power drive system and the second power drive system based on the current required torque.

A sum of first torque allocated to the first power drive system and second torque allocated to the second power drive system is equal to the current required torque.

The required torque is obtained by the vehicle based on operation information of the driver, and represents an overall requirement of the driver for the torque of the vehicle. After determining the required torque, the vehicle needs to allocate the required torque to the power systems, namely, the first power drive system and the second power drive system. A sum of the torque allocated to the first power drive system and the torque allocated to the second power drive system is equal to the required torque.

In one embodiment, after determining the required torque, the vehicle may allocate the required torque to the first power drive system and the second power drive system based on a specific torque control model. The torque control model may be created in advance based on a power requirement and an economic requirement of the vehicle.

For ease of differentiation, in this embodiment of this application, in this step, the torque allocated to the first power drive system based on the required torque is referred to as the first torque, and the torque allocated to the second power drive system based on the required torque is referred to as the second torque. The sum of the first torque and the second torque is equal to the required torque.

S204: Optimize the torque based on a current state of the vehicle at the current vehicle speed.

After the torque required by the driver is allocated to the first power drive system and the second power drive system, the first power drive system may be in one of the following three states.

A first state is a state in which the first power drive system resonates.

In this state, the first power drive system resonates. In this case, a vibration value and a noise value of the first power drive system completely exceed an acceptable range of a driver and a passenger, and smooth-going of the vehicle is extremely poor.

A second state is a state in which the first power drive system is in an NVH bad zone.

In this state, the first power drive system is in the NVH bad zone. When the first power drive system is in the NVH bad zone, although the first power drive system does not resonate, a noise value or a vibration value generated by the first power drive system can affect smooth-going of the vehicle, and affect an occupant. As described above, it can be determined that an operating condition is in the NVH bad zone of the power drive system if a vibration value or a noise value of the power drive system reaches a specific threshold when it running under a rotational speed and a speed. In some embodiments, the current vehicle speed corresponds to a specific rotational speed. At the rotational speed corresponding to the current vehicle speed and under the torque allocated to the first power drive system based on the required torque, if the vibration value of the first power drive system reaches a first preset threshold or the noise value of the first power drive system reaches a second preset threshold, it indicates that a current operating condition of the first power drive system is in the NVH bad zone.

It should be noted that first preset thresholds and second preset thresholds that are used to determine whether power drive systems of a same model are in NVH bad zones may be respectively the same. For example, if a model of a power drive system 1 is the same as that of a power drive system 2, a first preset threshold corresponding to the power drive system 1 is equal to a first preset threshold corresponding to the power drive system 2, and a second preset threshold corresponding to the power drive system 1 is equal to a second preset threshold corresponding to the power drive system 2.

First preset thresholds used to determine whether power drive systems of different models are in NVH bad zones may be the same, or may be different, and second preset thresholds used to determine whether the power drive systems of the different models are in the NVH bad zones may be the same, or may be different.

A first preset threshold and a second preset threshold that correspond to a power drive system of each model may be obtained through a specific test process before vehicle delivery. A specific process is described in detail in the following embodiment.

A third state is a state in which both a vibration value and a noise value of the first power drive system are in an acceptable range to an occupant.

In this state, the first power drive system does not resonate, and both the vibration value and the noise value of the first power drive system are less than a preset threshold. In other words, the first power drive system operates in a state in which the vehicle can achieve smooth-going.

It should be noted that in a specific implementation process, after the torque is allocated to each power drive system based on the required torque, the vehicle controller may separately determine a current state of each power drive system, and optimize the torque based on the current state of the power drive system.

If both the first power drive system and the second power drive system are in the third state, it indicates that both a current overall vibration value and a current overall noise value of the vehicle are in the acceptable range to an occupant, therefore, no torque optimization is needed.

If one of the first power drive system and the second power drive system resonates, that is, it is in the first state, the torque allocated to the first power drive system and the second power drive system will be adjusted according to a torque optimization method in a resonance state.

If one of the first power drive system and the second power drive system is in the NVH bad zone, that is, it is in the second state, the torque allocated to the first power drive system and the second power drive system will be adjusted according to a torque optimization method in the second state.

In a specific implementation process, the vehicle controller may optimize the torque in either of the following two manners.

First Manner

After allocating the torque to the first power drive system and the second power drive system based on the required torque, the vehicle controller first determines whether the first power drive system and the second power drive system are in the first state. If the first power drive system is in the first state, that is, the first power drive system resonates, the vehicle controller adjusts, according to the torque optimization method in the resonance state, the torque allocated to the first power drive system and the second power drive system. If neither the first power drive system nor the second power drive system is in the resonance state, the vehicle controller then determines whether the first power drive system and the second power drive system are in the second state. If the first power drive system is in the second state, that is, the first power drive system is in the NVH bad zone, the vehicle controller adjusts, according to the torque optimization method in the second state, the torque allocated to the first power drive system and the second power drive system.

Second Manner

After allocating the torque to the first power drive system and the second power drive system based on the required torque, the vehicle controller directly determines whether the first power drive system and the second power drive system are in the second state. If the first power drive system is in the second state, that is, the first power drive system is in the NVH bad zone, the vehicle controller adjusts, according to the torque optimization method in the second state, the torque allocated to the first power drive system and the second power drive system.

In the second manner, a process of determining whether the first power drive system and the second power drive system are in the second state and adjusting, according to the torque optimization method in the second state, the torque allocated to the first power drive system and the second power drive system is the same as a processing process in the second manner. Therefore, only a complete implementation process of the first manner is described in an embodiment of this application. For an implementation process of the second manner, refer to the first manner. Details are not described separately.

Figure 3:
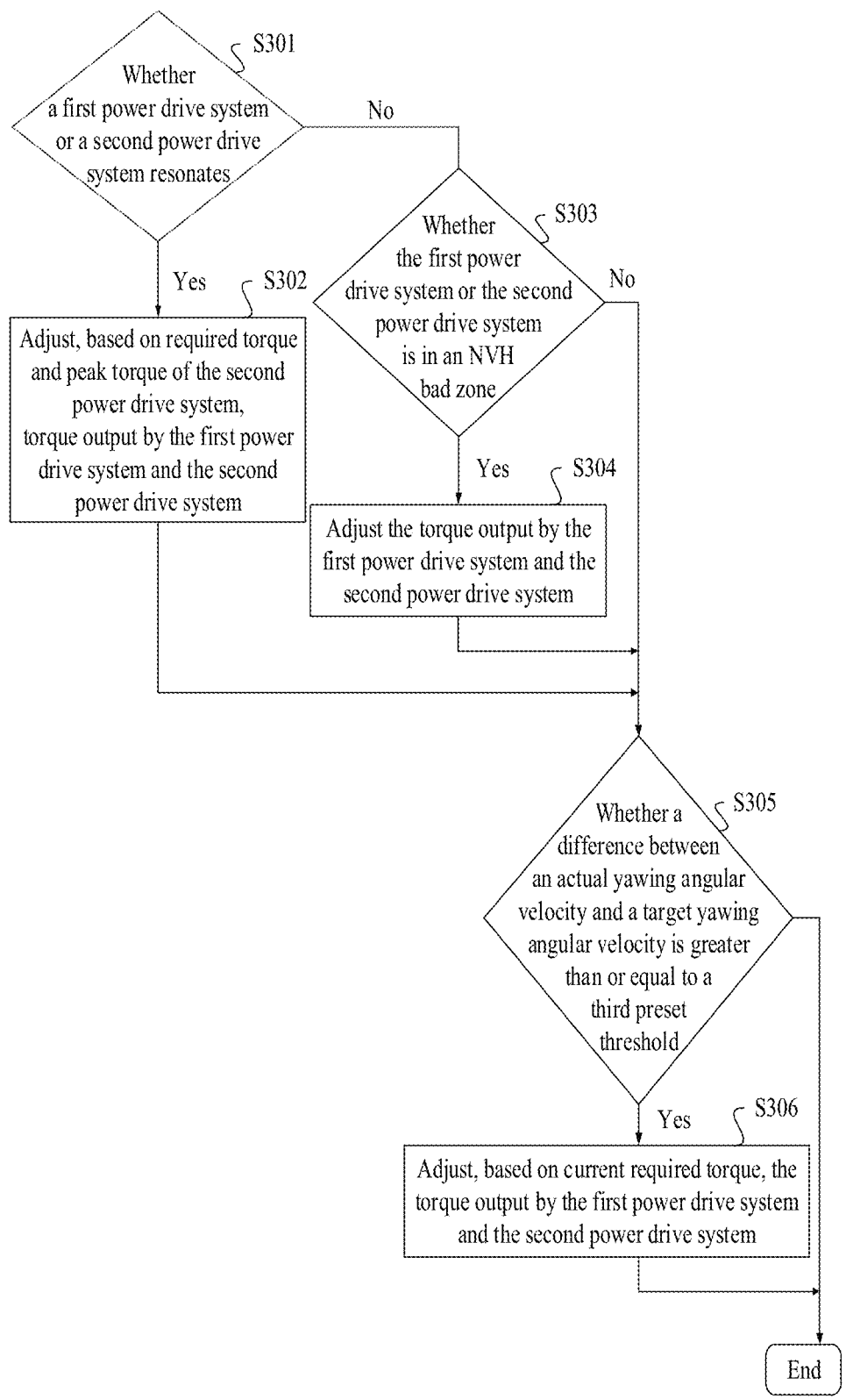
FIG. 3 is a schematic flowchart of a vehicle torque processing method according to an embodiment of this application.

FIG. 3 is a schematic flowchart of a vehicle torque processing method according to an embodiment of this application. As shown in FIG. 3, after allocating torque to a first power drive system and a second power drive system based on required torque, a vehicle controller may optimize the torque based on the following process.

S301: Determine whether the first power drive system or the second power drive system resonates, if yes, S302 will be performed, if no, S303 will be performed.

It should be noted that, when either the first power drive system or the second power drive system resonates, the following step S302 will be triggered to be performed. For ease of description, the following uses the first power drive system to indicate a power drive system that resonates.

In a manner, whether the first power drive system resonates may be determined by the following method, which is also suitable for determining the second power drive system, and details are not described again.

First, an intrinsic frequency of the first power drive system is determined. Further, it is determined whether the intrinsic frequency is a frequency in a resonance frequency range corresponding to the first power drive system, and if yes, it is determined that the first power drive system resonates.

The resonance frequency range refers to a frequency range in which a power drive system generates a resonance phenomenon, and is determined by a vibration characteristic of the power drive system. Resonance frequency ranges of power drive systems of a same model are the same and fixed. Before vehicle delivery, a bench test is performed on the power drive system in a lab, to obtain the resonance frequency range of the power drive system of this model. The resonance frequency range is written into storage space of the vehicle. In this step, the vehicle controller may directly read the resonance frequency range of the first power drive system.

In an embodiment of this application, it is considered that resonance frequency ranges of the first power drive system and the second power drive system are different. Therefore, at a given moment, only one of the first power drive system and the second power drive system may resonate. Furthermore, the allocated torque may be adjusted by using a method including the following steps.

The intrinsic frequency is a frequency signal of a power drive system. In one embodiment, intrinsic frequency "f" of the first power drive system may be calculated by following formula (1):

$$f = a*n/60 \qquad (1)$$

"a" represents a preset eigenvalue coefficient of the first power drive system, and the eigenvalue coefficient represents characteristic parameters of different structures, for example, a quantity of teeth of a gear, a quantity of slots of a motor, or a quantity of rolling elements of a bearing. Power drive systems of different models have different eigenvalue coefficients. "n" is a current rotational speed, and may be obtained by using the method in step S201. A rotational speed indicates a quantity of revolutions per minute of a power drive system, and a unit of the rotational speed may be revolutions per minute (rpm). The intrinsic frequency "f" obtained through calculation by using the formula (1) is a frequency signal, and represents a frequency at which a power drive system rotates, and a unit of "f" may be hertz (Hz).

In an example, it is assumed that a motor of the power drive system is a 48-slot motor. In this case, an eigenvalue coefficient "a" of the motor is 48. When a current rotational speed "n" of the motor is 3000 rpm, an intrinsic frequency "f" of the power drive system that is calculated by using the formula (1) is 2400 Hz.

It can be learned from the formula (1) that a higher vehicle speed indicates a higher rotational speed that has a fixed proportional relationship with the vehicle speed, and a higher intrinsic frequency obtained through calculation. If the intrinsic frequency obtained through calculation by using the formula (1) is a frequency in the resonance frequency range corresponding to the first power drive system, it may be determined that the first power drive system resonates; otherwise, it may be determined that the first power drive system does not resonate.

S302: Adjust, based on the required torque and peak torque of the second power drive system, torque output by the first power drive system and torque output by the second power drive system.

The peak torque of the second power drive system is maximum torque that can be output by the second power drive system.

For ease of differentiation, in this embodiment of this application, torque allocated to the first power drive system in this step is referred to as third torque, and torque allocated to the second power drive system in this step is referred to as fourth torque. A sum of the third torque and the fourth torque is less than or equal to the required torque.

In addition, this step is performed when the first power drive system resonates and the second power drive system does not resonate. Therefore, to make the first power drive system no longer resonate, the torque of the first power drive system needs to be reduced, and correspondingly, the torque allocated to the second power drive system needs to be increased. Therefore, the allocated third torque is greater than first torque, and the allocated fourth torque is greater than second torque.

The following describes a process of adjusting the allocated torque based on the required torque and the peak torque of the second power drive system.

First, allocable torque ranges of the first power drive system and the second power drive system in different cases are represented by using the following formula (2) and formula (3). The torque allocated to the first power drive system should be torque in an allocable torque range of the first power drive system, and the torque allocated to the second power drive system should be torque in an allocable torque range of the second power drive system.

$T<Tr$:

$R\in[0,T]$ $F\in[0,Tf]$ (2)

$T\geq Tr$:

$R\in[0,Tr]$ $F\in[T-Tr,Tf]$ (3)

T represents the required torque, and a stronger acceleration intent of a driver indicates a larger value of T. Tr represents the peak torque of the second power drive system. This parameter is a main performance indicator of the second power drive system, may be obtained through testing or the like before the vehicle delivery, and is stored in the vehicle controller. Tf represents peak torque of the first power drive system. This parameter is a main performance indicator of the first power drive system, may be obtained through testing or the like before the vehicle delivery, and is stored in the vehicle controller. R represents the allocable torque range of the second power drive system. F represents the allocable torque range of the first power drive system.

The formula (2) corresponds to a case in which the required torque is less than the peak torque of the second power drive system. In this case, the second power drive system can meet all torque requirements of the driver. Therefore, the allocable torque range of the second power drive system is 0 to the required torque.

The formula (3) corresponds to a case in which the required torque is greater than or equal to the peak torque of the second power drive system. In this case, the second power drive system cannot independently meet all the torque requirements of the driver. Therefore, the first power drive system needs to output specific torque for supplementation. In this case, the allocable torque range of the first power drive system is a difference (T−Tr) between the required torque and the peak torque of the second power drive system to the peak torque (Tf) of the first power drive system.

In an example, it is assumed that the peak torque of the first power drive system is 150 Nm, and the peak torque of the second power drive system is 300 Nm. When torque required by the driver is 200 Nm, the peak torque of the second power drive system is greater than the required torque, the allocable torque range of the first power drive system is [0, 150 Nm], and the allocable torque range of the second power drive system is [0, 200 Nm]. When torque required by the driver is 350 Nm, the peak torque of the second power drive system is less than the required torque, the allocable torque range of the first power drive system is [50 Nm, 150 Nm], and the allocable torque range of the second power drive system is [0, 300 Nm].

It can be learned from the descriptions of the forgoing formula (2) and formula (3) that the torque allocated to the first power drive system and the second power drive system need to meet allocable torque ranges respectively. When a power drive system resonates, vibration and noise of the power drive system are extremely amplified. Therefore, when the first power drive system resonates, implementations in the following two cases may be performed, so that the first power drive system that resonates can output minimum torque.

In one case, if the required torque is less than the peak torque of the second power drive system, the third torque output by the first power drive system is equal to zero, and the fourth torque output by the second power drive system is equal to the required torque.

If the required torque is less than the peak torque of the second power drive system, it indicates that the second power drive system can independently meet all the torque requirements of the driver. Therefore, all the required torque may be allocated to the second power drive system, and no torque is allocated to the first power drive system. Therefore, the vibration and the noise of the first power drive system can be quickly reduced, so that vibration and noise of the vehicle can be kept in an acceptable range of an occupant, to ensure smooth-going of the vehicle.

In the other case, if the required torque is greater than or equal to the peak torque of the second power drive system, the fourth torque output by the second power drive system is equal to the peak torque of the second power drive system, and the third torque output by the first power drive system is equal to a difference obtained by subtracting the peak torque from the required torque.

If the required torque is greater than or equal to the peak torque of the second power drive system, it indicates that the second power drive system cannot independently meet all the torque requirements of the driver. Therefore, the peak torque of the second power drive system may be allocated to the second power drive system, so that the second power drive system outputs maximum torque, and a remaining part after the peak torque of the second power drive system is subtracted from the required torque is allocated to the first power drive system. By using this method, when the required torque is met, minimum torque can be allocated to the first power drive system that resonates, so that the vibration and the noise of the first power drive system can be minimized, thereby keeping the vibration and the noise of the vehicle in the acceptable range of the occupant, and improving the smooth-going of the vehicle to a maximum extent.

In an example, it is assumed that the peak torque of the first power drive system is 150 Nm, and the peak torque of the second power drive system is 300 Nm. When the torque required by the driver is 200 Nm, torque may be not allocated to the first power drive system, and all the required torque 200 Nm may be allocated to the second power drive system. When the torque required by the driver is 350 Nm, torque allocated to the first power drive system is 50 Nm, and torque allocated to the second power drive system is 300 Nm.

After the torque is allocated according to this step, the following step S305 may continue to be performed, to further determine whether oversteer or understeer occurs in the vehicle after the torque is allocated.

If neither the first power drive system nor the second power drive system resonates in step S301, the following step S303 continues to be performed, to determine and process an NVH bad zone.

S303: Determine whether the first power drive system or the second power drive system is in the NVH bad zone, if yes, S304 is performed, if no, the process is ended.

As described above, a current vehicle speed corresponds to a specific rotational speed. At the rotational speed corresponding to the current vehicle speed and under the torque allocated to the first power drive system based on the required torque, if a vibration value of the first power drive system reaches a first preset threshold or a noise value of the first power drive system reaches a second preset threshold, it indicates that a current operating condition of the first power drive system is in the NVH bad zone.

Power drive systems of a same model may have a same NVH bad zone. Information about an NVH bad zone of a power drive system of each model may be obtained after a vibration and noise test is performed on the power drive system before vehicle delivery. The following describes a process of obtaining the NVH bad zone through testing.

Figure 4:
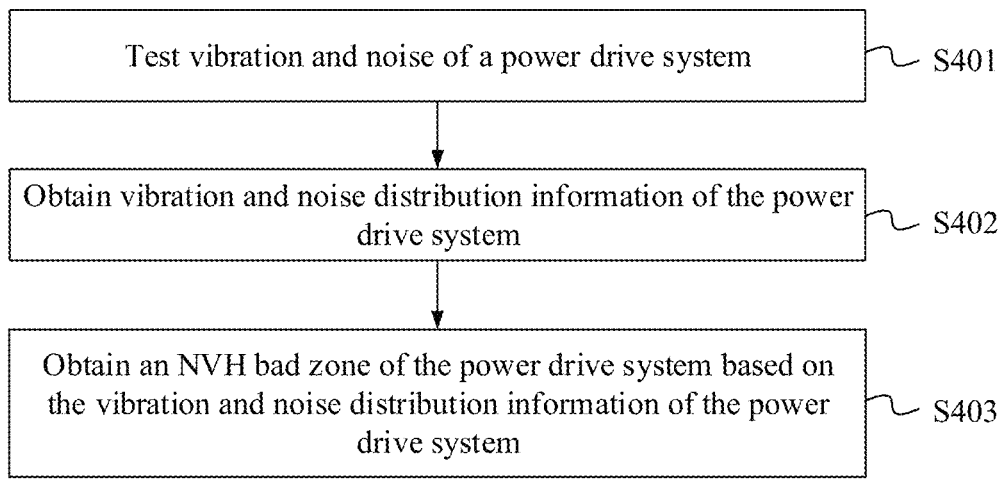
FIG. 4 is a schematic flowchart of obtaining an NVH bad zone in a vehicle torque processing method according to an embodiment of this application.

FIG. 4 is a schematic flowchart of obtaining an NVH bad zone in a vehicle torque processing method according to an embodiment of this application. As shown in FIG. 4, the process of obtaining the NVH bad zone through testing includes the following steps.

S401: Test vibration and noise of a power drive system.

In one embodiment, vibration data and noise data of the power drive system at different rotational speeds (corresponding to different vehicle speeds of a vehicle) and under different torque may be collected.

The following Table 1 shows an example of vibration and noise data, of a power drive system of a model, that is collected at different rotational speeds (vehicle speeds) and under different torque. In the following Table 1, a unit of a vehicle speed is km/h, a unit of a rotational speed is rpm, a unit of torque is Nm, a unit of a vibration value is g, and a unit of a noise value is dB.

Both the first preset threshold and the second preset threshold are related to a grade and a vehicle speed of a vehicle. In some embodiments, a higher grade of the vehicle indicates a stricter setting of the first preset threshold and the second preset threshold. A higher vehicle speed indicates louder road noise and wind noise, a smaller vibration-noise ratio of the power drive system, and a looser setting of the first preset threshold and the second preset threshold.

In one embodiment, the first preset threshold may be calculated by using the following formula (4), and the second preset threshold may be calculated by using the following formula (5).

$$Vv = bv * Nv \quad (4)$$

$$Nv = av * (N0 - Nc) \quad (5)$$

"Vv" represents a vibration threshold when the vehicle speed is v, namely, the first preset threshold. "bv" is a vibration-noise-related factor, and indicates an association between vibration and noise. "bv" is determined by a vibration feature of the power drive system, is related to the vehicle speed, and may be fitted and calibrated through vibration and noise experiments.

"Nv" represents a noise threshold when the vehicle speed is "v", namely, the second preset threshold. "av" is a speed impact factor when the vehicle speed is "v". In one embodiment, av>1, and a higher vehicle speed indicates larger av. "N0" is a noise value, of the power drive system, that is obtained through decomposition based on a noise value of a whole vehicle specified in the national standard GB 1495-2002, and "N0" may be obtained through calculation by using a specific algorithm model. "Nc" is a noise compen-

TABLE 1

| | Vehicle speed | | | | | | | | | |
|---|---|---|---|---|---|---|---|---|---|---|
| | 28.6 | | | | | 54.3 | | | | |
| | Rotational speed | | | | | | | | | |
| | 2000 | | | | | 3800 | | | | |
| | Torque | | | | | | | | | |
| | 60 | 120 | 180 | 240 | 300 | 60 | 120 | 180 | 240 | 300 |
| Vibration value | 2.4 | 3.1 | 4.5 | 3.2 | 3.8 | 2.2 | 5.6 | 4.2 | 5.2 | 5.5 |
| Noise value | 68 | 68 | 70 | 71 | 72 | 73 | 82 | 75 | 76 | 75 |

S402: Obtain vibration and noise distribution information of the power drive system.

The vibration and noise distribution information of the power drive system is used to represent distribution features of a noise value and a vibration value with respect to a rotational speed and torque.

S403: Obtain an NVH bad zone of the power drive system based on the vibration and noise distribution information of the power drive system.

Based on vibration and noise distribution of the power drive system, it may be determined whether the power drive system is in the NVH bad zone at different rotational speeds and under different torque. A determining basis is the first preset threshold and the second preset threshold described above. The first preset threshold is a threshold of the vibration value, and the second preset threshold is a threshold of the noise value. Power drive systems of one model have a fixed first preset threshold and a fixed second preset threshold, and the thresholds may be obtained by using the following process before vehicle delivery.

sation value, and indicates a requirement of a vehicle grade on a noise threshold. In one embodiment, Nc>0, and a higher vehicle grade indicates larger Nc.

The following Table 2 shows an example of a first preset threshold and a second preset threshold of a power drive system of a class-B vehicle that are obtained through calculation by using the formula (4) and the formula (5).

TABLE 2

| | Vehicle speed | | | |
|---|---|---|---|---|
| | 0-30 | 30-60 | 60-80 | Above 80 |
| First preset threshold | 4 | 6 | 6.5 | 6.8 |
| Second preset threshold | 73 | 80 | 83 | 85 |

When the first preset threshold and the second preset threshold are learned, it may be determined, at a specific vehicle speed and under specific torque of the first power drive system, whether the vibration value of the first power drive system is greater than the first preset threshold, or whether the noise value of the first power drive system is greater than the second preset threshold. As long as either of the two conditions is met, it may be determined that the first power drive system is in the NVH bad zone at the specific vehicle speed and under the specific torque.

The following Table 3 shows NVH bad zone information, of a power drive system of a model, that is obtained by using the foregoing determining method.

TABLE 3

| Vehicle speed | 28.6 | | | | | 54.3 | | | | |
|---|---|---|---|---|---|---|---|---|---|---|
| Rotational speed | 2000 | | | | | 3800 | | | | |
| Torque | 60 | 120 | 180 | 240 | 300 | 60 | 120 | 180 | 240 | 300 |
| Vibration value | 2.4 | 3.1 | 4.5 | 3.2 | 3.8 | 2.2 | 5.6 | 4.2 | 5.2 | 5.5 |
| Noise value | 68 | 68 | 70 | 71 | 72 | 73 | 82 | 75 | 76 | 75 |
| Vibration threshold | 4 | | | | | 6 | | | | |
| Noise threshold | 73 | | | | | 80 | | | | |
| Bad zone score | 0 | 0 | 1 | 0 | 0 | 0 | 1 | 0 | 0 | 0 |
| NVH bad zone | | | ✓ | | | | ✓ | | | |

As shown in Table 3, for the power drive system of this model, at a rotational speed 2000 (corresponding to a vehicle speed 28.6), it is calculated by using the formula (4) and the formula (5) that a vibration threshold is 4, and a noise threshold is 73. At the rotational speed 2000, when torque is 180, because a vibration value is 4.5, which exceeds the vibration threshold 4, it can be learned that, at the rotational speed 2000 and under the torque 180, the power drive system is in the NVH bad zone. In this case, a bad zone score is 1. When the bad zone score is 0, it indicates that at a corresponding rotational speed and under corresponding torque, the vibration value of the power drive system does not exceed the vibration threshold, a noise value of the power drive system does not exceed the noise threshold, so that the power drive system is not in the NVH bad zone. In other words, when the bad zone score is 0, it indicates that the power drive system is not in the NVH bad zone.

Before the vehicle delivery, the NVH bad zone information shown in Table 3 may be stored in the vehicle controller of the vehicle. After the first torque is allocated to the first power drive system based on the required torque, in step S303, after obtaining a current vehicle speed and the first torque, the vehicle controller determines whether the vibration value or the noise value of the first power drive system exceeds a corresponding threshold at the current vehicle speed and under the first torque, to further determine whether the first power drive system is in the NVH bad zone.

S304: Adjust torque output by the first power drive system and torque output by the second power drive system.

For ease of differentiation, in this embodiment of this application, torque allocated to the first power drive system in this step is referred to as fifth torque, and torque allocated to the second power drive system in this step is referred to as sixth torque.

A sum of the fifth torque output by the first power drive system and the sixth torque output by the second power drive system is less than or equal to the required torque, the fifth torque is torque in at least one first available torque range, the sixth torque is torque in at least one second available torque range, the fifth torque is less than the first torque, and the sixth torque is greater than the second torque.

The first available torque range is an available range of the first power drive system, and the second available torque range is an available range of the second power drive system.

The fifth torque and the sixth torque are torque in the forgoing at least one available torque range.

In an embodiment of this application, there may be a correspondence between the at least one first available torque range and the at least one second available torque range, and the first available torque range and the second available torque range that have the correspondence may be represented as an available torque range. Therefore, it may be considered that in this embodiment of this application, at least one available torque range is included, and each available torque range includes the first available torque range of the first power drive system and the second available torque range corresponding to the first available torque range. The second available torque range is an available range of the second power drive system.

In one embodiment, the at least one available torque range is a range other than an unavailable torque range of the first power drive system and an unavailable torque range of the second power drive system.

The unavailable torque range of the first power drive system is a torque range that meets the following condition:

At the current vehicle speed and under any torque in the unavailable torque range of the first power drive system, the vibration value of the first power drive system is greater than the first preset threshold, or the noise value of the first power drive system is greater than the second preset threshold.

The unavailable torque range of the second power drive system is a torque range that meets the following condition:

At the current vehicle speed and under any torque in the unavailable torque range of the second power drive system, a vibration value of the second power drive system is greater than the first preset threshold or a noise value of the second power drive system is greater than the second preset threshold.

The at least one available torque range may also be explained as follows:

Each available torque range includes the first available torque range of the first power drive system and the second available torque range corresponding to the first available torque range, and the second available torque range is the available range of the second power drive system.

At the current vehicle speed and under any torque that is in the first available torque range and that is output by the first power drive system, the vibration value of the first power drive system is less than or equal to the first preset threshold, and the noise value of the first power drive system is less than or equal to the second preset threshold.

At the current vehicle speed and under any torque that is in the second available torque range and that is output by the second power drive system, the vibration value of the second power drive system is less than or equal to the first preset threshold, and the noise value of the second power drive system is less than or equal to the second preset threshold.

The following further describes an available torque range and a process of allocating torque based on the available torque range with reference to a formula, a figure, and the like.

First, the first available torque range of the first power drive system, the second available torque range of the second power drive system, and the available torque range are represented by using the following formula (6) and formula (7).

$$\begin{cases} x + y = T \\ x \notin A1 \cup A2 \cup \ldots \\ y \notin B1 \cup B2 \cup \ldots \end{cases} \quad (6)$$

Figure 5:
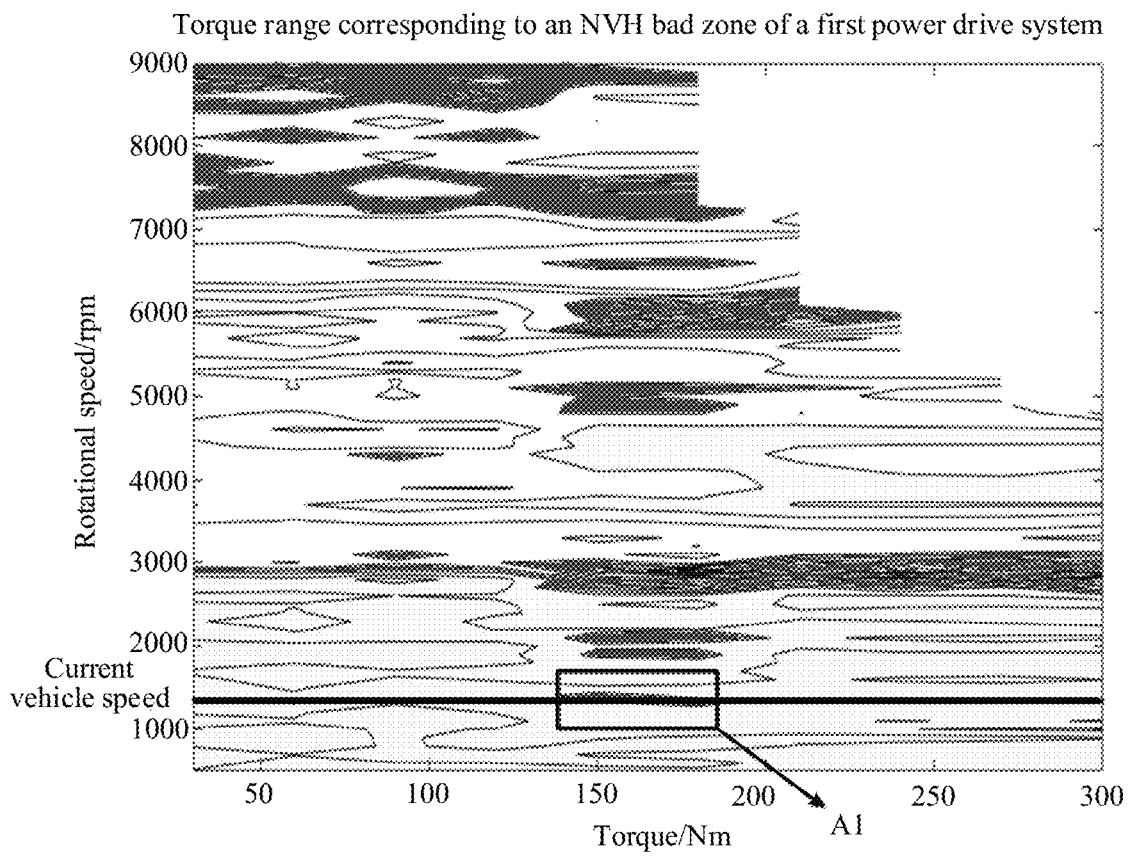
FIG. 5 is an example of a torque range corresponding to an NVH bad zone of a first power drive system.

"x" represents torque allocated to the first power drive system, and may form the foregoing first available torque range. "y" represents torque allocated to the second power drive system, and may form the foregoing second available torque range. "T" represents the required torque. A1, A2, . . . are torque ranges corresponding to NVH bad zones of the first power drive system at the current vehicle speed, namely, unavailable torque ranges of the first power drive system. B1, B2, . . . are torque ranges corresponding to NVH bad zones of the second power drive system at the current vehicle speed, namely, unavailable torque ranges of the second power drive system. FIG. 5 is an example of the torque ranges corresponding to the NVH bad zones of the first power drive system. As shown in FIG. 5, distribution of the NVH bad zones of the first power drive system is an area shown in black gray in the figure, and the distribution corresponds to the information shown in the foregoing Table 3. In other words, the NVH bad zone information of the power drive system may be represented in a graphical manner in FIG. 5, or may be represented in a form manner in Table 3. After the current vehicle speed is obtained, the torque range, for example, A1, corresponding to the NVH bad zone of the first power drive system at the current vehicle speed may be obtained from FIG. 5.

After the formula (6) is solved, the obtained at least one available torque range including the first available torque range of the first power drive system and the second available torque range of the second power drive system may be the following formula (7):

$$(x,y) \in C1 \cup C2 \cup \quad (7)$$

C1, C2, . . . each represent an available torque range, and the available torque range includes a torque range of the first power drive system and a torque range of the second power drive system.

Figure 6:
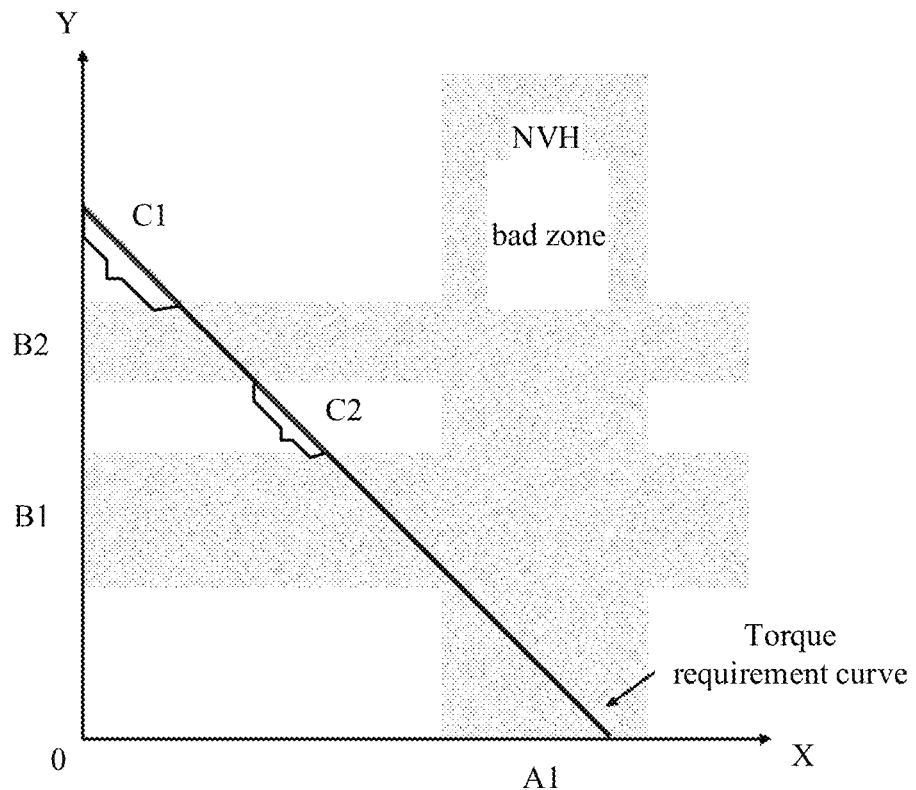
FIG. 6 is an example diagram of an available torque range.

FIG. 6 is an example diagram of the available torque range. As shown in FIG. 6, A1 is an unavailable torque range of the first power drive system, and B1 and B2 are unavailable torque ranges of the second power drive system. A torque requirement curve may be obtained based on the required torque. On the torque requirement curve, a part that does not fall within the unavailable torque range of the first power drive system and that does not fall within the unavailable torque ranges of the second power drive system may be used an available torque range. For example, in FIG. 6, a part C1 and a part C2 do not fall within the unavailable torque range of the first power drive system and do not fall within the unavailable torque ranges of the second power drive system. Therefore, C1 is an available torque range, and C2 is also an available torque range. Each available torque range includes both the first available torque range of the first power drive system and the second available torque range of the second power drive system. Torque is allocated in C1 or C2, so that the NVH bad zone of the first power drive system and the NVH bad zone of the second power drive system can be avoided.

The torque allocated to the first power drive system and the second power drive system should be torque in the available torque range, for example, torque in C1 or C2.

After the available torque range is obtained, the torque may be allocated based on the available torque range.

In an optional implementation, the fifth torque output by the first power drive system is torque that is in the at least one first available torque range and that has a smallest difference from the first torque, and the sixth torque output by the second power drive system is torque that is in the at least one second available torque range and that has a smallest difference from the second torque. In this manner, an adjustment variation of the torque can be minimum when the smooth-going of the vehicle is ensured, to improve processing efficiency and stability of the systems of the vehicle.

In some embodiments, $\Delta$ is used to indicate a torque difference, and the fifth torque and the sixth torque are torque that minimizes a value of $\Delta$ in the following formula (8).

$$\Delta = |Tr1 - Tr0| = |Tf1 - Tf0| \quad (8)$$

Tr0 represents the second torque allocated to the second power drive system, Tf0 represents the first torque allocated to the first power drive system, Tr represents the sixth torque newly allocated to the second power drive system, and Tf1 represents the fifth torque newly allocated to the first power drive system.

It is assumed that the required torque is T, Tr0, Tr1, Tf0, Tf1, and T meet the following formula (9):

$$T = Tf0 + Tr0 = Tf1 + Tr1 \quad (9)$$

To be specific, when torque is allocated each time, a sum of the torque allocated to the first power drive system and the second power drive system is equal to the required torque T. For example, the available torque ranges are the forgoing C1 and C2. In second available torque ranges, of the second power drive system, that correspond to C1 and C2, there is the torque Tr allocated to the second power drive system, so that the allocated torque Tr can meet the formula (8). For example, Tr may be obtained by using a method such as traversal.

Further, Tr is used as the sixth torque, a difference between the required torque and Tr is used as the fifth torque. Then the fifth torque is allocated to the first power drive system, and the sixth torque is allocated to the second power drive system.

For example, it is assumed that Tr0=50 Nm, Tf0=20 Nm, and T=Tf0+Tr0=70 Nm. If the available torque range is C1, a torque range of the first power drive system is [0-30 Nm], and torque of the second power drive system=the required torque-torque of the first power drive system, and if the available torque range is C2, a torque range of the first power drive system is [60 Nm-120 Nm], and torque of the second power drive system=the required torque−torque of the first power drive system, it can be learned through calculation based on a traversal method that when Tr1=60 Nm, Δ=|Tr1−Tr0|=10 Nm is minimum. In this case, Tf1=T−Tr1=10 Nm. The sixth torque allocated to the second power drive system is 60 Nm, and the fifth torque allocated to the first power drive system is 10 Nm, so that both the NVH bad zones of the first power drive system and the second power drive system can be avoided.

After the torque is allocated according to this step, the following step S305 may continue to be performed, to further determine whether oversteer or understeer occurs in the vehicle after the torque is allocated.

S305: Determine whether a difference between an actual yawing angular velocity and a target yawing angular velocity of the vehicle is greater than or equal to a third preset threshold, if yes, step S306 is performed, otherwise, the process is ended.

In one embodiment, an actual yawing angle may be obtained through real-time measurement by using a yawing angular velocity sensor on the vehicle, and the target yawing angular velocity may be obtained through calculation by using an ideal bicycle model or a two-degree-of-freedom model.

When the difference between the actual yawing angular velocity and the target yawing angular velocity of the vehicle is greater than the third preset threshold, it indicates that the vehicle is in an oversteer state or an understeer state in this case. Therefore, the allocated torque needs to be adjusted to avoid oversteer or understeer of the vehicle.

S306: Adjust, based on current required torque, the torque output by the first power drive system and the torque output by the second power drive system.

If the first power drive system currently outputs the third torque, and the second power drive system currently outputs the fourth torque, the third torque output by the first power drive system and the fourth torque output by the second power drive system are adjusted.

If the first power drive system currently outputs the fifth torque, and the second power drive system currently outputs the sixth torque, the fifth torque output by the first power drive system and the sixth torque output by the second power drive system are adjusted.

Under seventh torque allocated to the first power drive system and eighth torque allocated to the second power drive system, the difference between the actual yawing angular velocity and the target yawing angular velocity is less than the third preset threshold.

The third preset threshold can be determined by using a road surface adhesion coefficient and a lateral acceleration. In one embodiment, the third preset threshold may be obtained through calculation by using the following formula (10):

$$\min(0.1*(1+0.3*|d(ay)/dt|)*(1-mue), 0.34) \quad (10)$$

d(ay)/dt is a lateral acceleration change rate, and mue is the road surface adhesion coefficient.

In this embodiment, a problem that vibration or noise of the vehicle affects the smooth-going of the vehicle can be resolved by only optimizing torque allocation of the vehicle, without increasing any hardware cost, increasing system complexity, or occupying space of the vehicle. At the same time, costs of the whole vehicle in vibration and noise suppression devices such as a sound-absorbing coating material and suspension bushing can be reduced, and a weight and a volume of the whole vehicle can be reduced.

In addition, when the first power drive system resonates, the torque allocated to the first power drive system and the second power drive system is adjusted based on the current required torque and peak torque of the second power drive system. Because the peak torque of the second power drive system is involved, when the required torque is met, the torque allocated to the first power drive system can be minimized, so that vibration and noise of the first power drive system that resonates are significantly reduced, thereby ensuring the smooth-going of the vehicle.

When the first power drive system is in the NVH bad zone, the torque output by the first power drive system is adjusted based on the first available torque range, and the torque output by the second power drive system is adjusted based on the second available torque range, so that both the NVH bad zones of the first power drive system and the second power drive system can be avoided, to ensure the smooth-going of the vehicle.

The foregoing steps S301 to S305 describe a process in which the torque is optimized for the vehicle in the first manner.

However, in the second manner, to be specific, when the vehicle controller directly determines whether the first power drive system and the second power drive system are in the second state described above, and performs subsequent processing based on a determining result, in this implementation, the foregoing steps S303 to S306 may be performed. A specific process is not described herein again.

Figure 7:
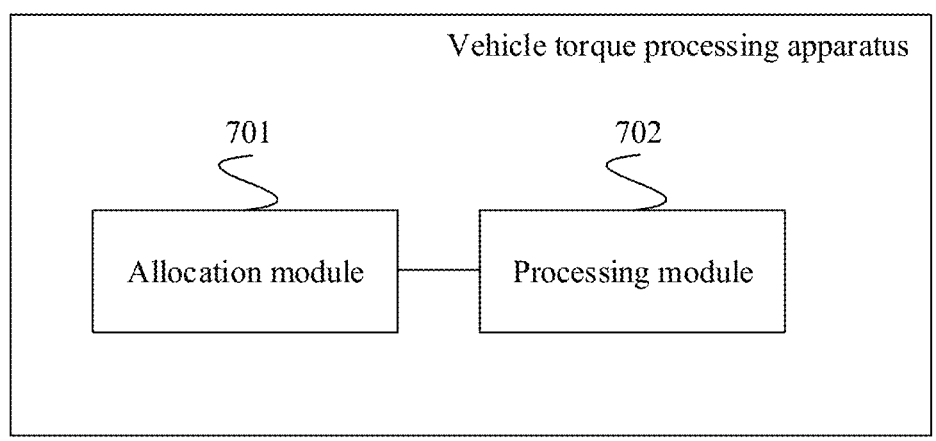
FIG. 7 is a schematic structural diagram of a vehicle torque processing apparatus according to an embodiment of this application.

FIG. 7 is a schematic structural diagram of a vehicle torque processing apparatus according to an embodiment of this application. As shown in FIG. 7, the apparatus includes:

an allocation module 701, configured to allocate torque to a first power drive system and a second power drive system based on required torque, where a sum of first torque output by the first power drive system and second torque output by the second power drive system is equal to the required torque; and a processing module 702, configured to: at a current vehicle speed, when a intrinsic frequency of the first power drive system is a frequency in a resonance frequency range corresponding to the first power drive system, adjust, based on the required torque and peak torque of the second power drive system, the torque output by the first power drive system and the torque output by the second power drive system, where after adjustment, torque output by the first power drive system is third torque, torque output by the second power drive system is fourth torque, the fourth torque is less than or equal to the peak torque of the second power drive system, the third torque is less than the first torque, and the fourth torque is greater than the second torque.

In a possible implementation, a sum of the third torque and the fourth torque is less than or equal to the required torque.

In a possible implementation, the processing module 702 is configured to:

when the required torque is less than the peak torque of the second power drive system, the third torque output by the first power drive system is equal to zero, and the fourth torque output by the second power drive system is equal to the required torque.

In a possible implementation, the processing module 702 is configured to:

when the required torque is greater than or equal to the peak torque of the second power drive system, the fourth torque output by the second power drive system is equal to the peak torque of the second power drive system, and the third torque output by the first power drive system is equal to a difference obtained by subtracting the peak torque from the required torque.

In a possible implementation, the processing module 702 is further configured to:

determine the intrinsic frequency of the first power drive system based on a current rotational speed corresponding to the current vehicle speed and a preset eigenvalue coefficient of the first power drive system.

In a possible implementation, the processing module 702 is further configured to:

when a difference between an actual yawing angular velocity and a target yawing angular velocity is greater than or equal to a third preset threshold, adjust, based on current required torque, the third torque output by the first power drive system and the fourth torque output by the second power drive system, so that under seventh torque output by the first power drive system and eighth torque output by the second power drive system, a difference between an actual yawing angular velocity and a target yawing angular velocity is less than the third preset threshold.

The vehicle torque processing apparatus provided in this embodiment of this application may perform the method steps in the foregoing method embodiments. Implementation principles and technical effects thereof are similar, and details are not described herein again.

Figure 8:
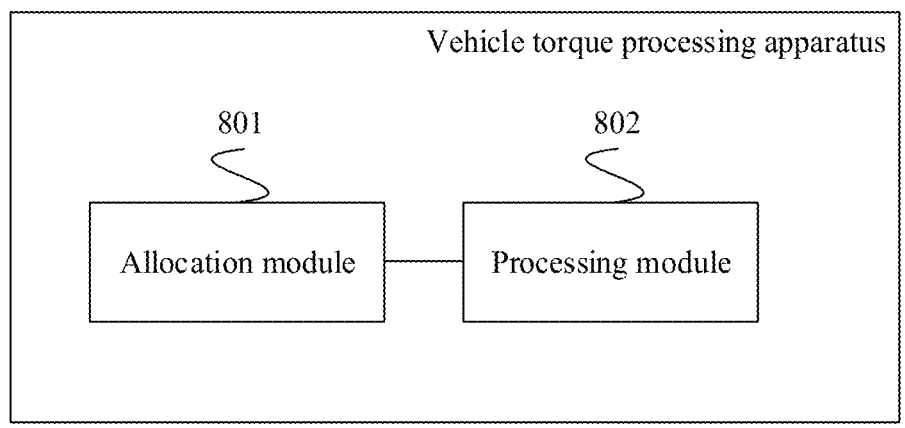
FIG. 8 is a schematic structural diagram of another vehicle torque processing apparatus according to an embodiment of this application.

FIG. 8 is a schematic structural diagram of another vehicle torque processing apparatus according to an embodiment of this application. As shown in FIG. 8, the apparatus includes:

an allocation module 801, configured to allocate torque to a first power drive system and a second power drive system based on required torque, where a sum of first torque output by the first power drive system and second torque output by the second power drive system is equal to the required torque; and a processing module 802, configured to: at a current vehicle speed and under the first torque currently allocated to the first power drive system, when a vibration value of the first power drive system is greater than a first preset threshold or a noise value of the first power drive system is greater than a second preset threshold, adjust, based on at least one available torque range, the torque output by the first power drive system and the torque output by the second power drive system, where after adjustment, torque output by the first power drive system is fifth torque, torque output by the second power drive system is sixth torque, the fifth torque is torque in at least one first available torque range, the sixth torque is torque in at least one second available torque range, and the fifth torque is less than the first torque.

The first available torque range is an available range of the first power drive system, and the second available torque range is an available range of the second power drive system.

At the current vehicle speed and under any torque that is in the first available torque range and that is output by the first power drive system, a vibration value of the first power drive system is less than or equal to the first preset threshold, and a noise value of the first power drive system is less than or equal to the second preset threshold.

At the current vehicle speed and under any torque that is in the second available torque range and that is output by the second power drive system, a vibration value of the second power drive system is less than or equal to the first preset threshold, and a noise value of the second power drive system is less than or equal to the second preset threshold.

In a possible implementation, a sum of the fifth torque and the sixth torque is less than or equal to the required torque.

In a possible implementation, the fifth torque is torque that is in the at least one first available torque range and that has a smallest difference from the first torque, and the sixth torque is torque that is in the at least one second available torque range and that has a smallest difference from the second torque.

In a possible implementation, the processing module 802 is further configured to:

when a difference between an actual yawing angular velocity and a target yawing angular velocity is greater than or equal to a third preset threshold, adjust, based on current required torque, the fifth torque output by the first power drive system and the sixth torque output by the second power drive system, so that under seventh torque output by the first power drive system and eighth torque output by the second power drive system, a difference between an actual yawing angular velocity and a target yawing angular velocity is less than the third preset threshold.

The vehicle torque processing apparatus provided in this embodiment of this application may perform the method steps in the foregoing method embodiments. Implementation principles and technical effects thereof are similar, and details are not described herein again.

Figure 9:
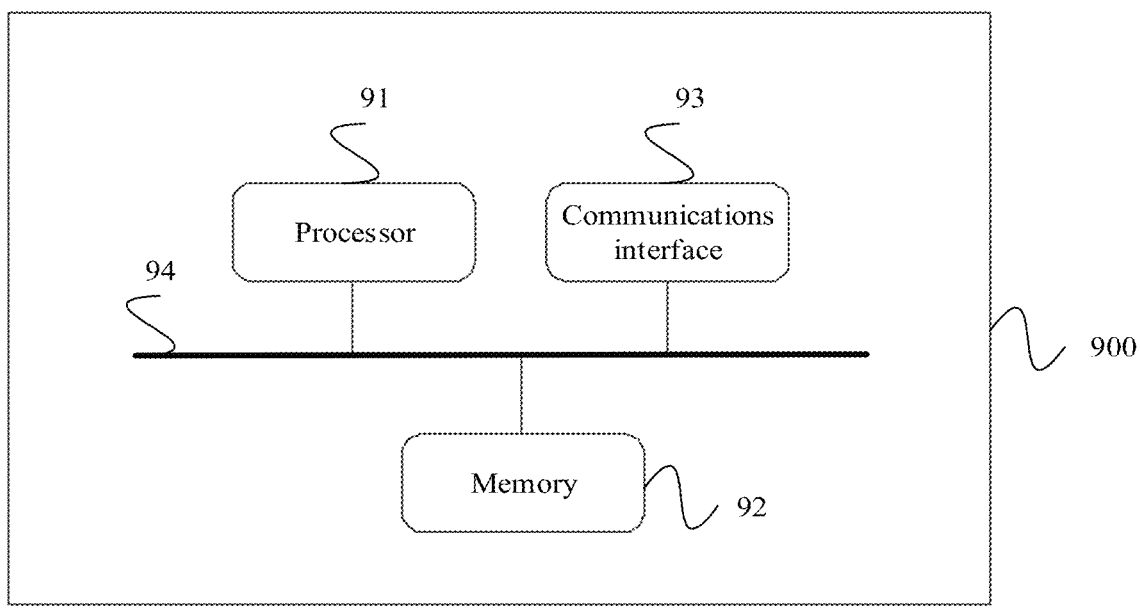
FIG. 9 is a schematic structural diagram of a vehicle controller 900 according to an embodiment of this application.

FIG. 9 is a schematic structural diagram of a vehicle controller 900 according to an embodiment of this application. As shown in FIG. 9, the vehicle controller 900 may include a processor 91, a memory 92, a communications interface 93, and a system bus 94. The memory 92 and the communications interface 93 are connected to the processor 91 and communicate with each other through the system bus 94. The memory 92 is configured to store computer-executable instructions. The communications interface 93 is configured to communicate with other apparatuses (for example, a first power drive system and a second power drive system). The processor 91 implements the solutions of the embodiments shown in FIG. 1 to FIG. 6 when executing a computer program. The vehicle controller may be the vehicle controller in the vehicle shown in FIG. 1. Alternatively, the processor 91 may be integrated into a processor of a computing system in the vehicle, or may be a processing module or a computing capability module in a vehicle-mounted computing platform. In addition, in one embodiment, the memory 92 is further configured to store the resonance frequency range information, the peak torque of the power drive system, the NVH bad zone information of the power drive system, and the like in the foregoing method embodiments. When performing the method steps in the foregoing method embodiments, the processor 91 may read required information from the memory 92.

The processor 91 is configured to:

allocate torque to the first power drive system and the second power drive system based on required torque, where a sum of first torque output by the first power drive system and second torque output by the second power drive system is equal to the required torque; and at a current vehicle speed, when an intrinsic frequency of the first power drive system is a frequency in a resonance frequency range corresponding to the first power drive system, adjust, based on the required torque and peak torque of the second power drive system, the torque output by the first power drive system and the torque output by the second power drive system, where after adjustment, torque output by the first power drive system is third torque, torque output by the second power drive system is fourth torque, the fourth torque is less than or equal to the peak torque of the second power drive system, the third torque is less than the first torque, and the fourth torque is greater than the second torque.

In a possible implementation, a sum of the third torque and the fourth torque is less than or equal to the required torque.

In a possible implementation, the processor 91 is further configured to:
when the required torque is less than the peak torque of the second power drive system, the third torque output by the first power drive system is equal to zero, and the fourth torque output by the second power drive system is equal to the required torque.

In a possible implementation, the processor 91 is further configured to:
when the required torque is greater than or equal to the peak torque of the second power drive system, the fourth torque output by the second power drive system is equal to the peak torque of the second power drive system, and the third torque output by the first power drive system is equal to a difference obtained by subtracting the peak torque from the required torque.

In a possible implementation, the processor 91 is further configured to:
determine the intrinsic frequency of the first power drive system based on a current rotational speed corresponding to the current vehicle speed and a preset eigenvalue coefficient of the first power drive system.

In a possible implementation, the processor 91 is further configured to:
when a difference between an actual yawing angular velocity and a target yawing angular velocity is greater than or equal to a third preset threshold, adjust, based on current required torque, the third torque output by the first power drive system and the fourth torque output by the second power drive system, so that under seventh torque output by the first power drive system and eighth torque output by the second power drive system, a difference between an actual yawing angular velocity and a target yawing angular velocity is less than the third preset threshold.

In another embodiment, the processor 91 is configured to:
allocate torque to a first power drive system and a second power drive system based on required torque, where a sum of first torque output by the first power drive system and second torque output by the second power drive system is equal to the required torque; and
at a current vehicle speed and under the first torque currently allocated to the first power drive system, when a vibration value of the first power drive system is greater than a first preset threshold or a noise value of the first power drive system is greater than a second preset threshold, adjust torque output by the first power drive system and torque output by the second power drive system, where after adjustment, torque output by the first power drive system is fifth torque, torque output by the second power drive system is sixth torque, the fifth torque is torque in at least one first available torque range, the sixth torque is torque in at least one second available torque range, and the fifth torque is less than the first torque.

The first available torque range is an available range of the first power drive system, and the second available torque range is an available range of the second power drive system.

At the current vehicle speed and under any torque that is in the first available torque range and that is output by the first power drive system, a vibration value of the first power drive system is less than or equal to the first preset threshold, and a noise value of the first power drive system is less than or equal to the second preset threshold.

At the current vehicle speed and under any torque that is in the second available torque range and that is output by the second power drive system, a vibration value of the second power drive system is less than or equal to the first preset threshold, and a noise value of the second power drive system is less than or equal to the second preset threshold.

In a possible implementation, the fifth torque is torque that is in the at least one first available torque range and that has a smallest difference from the first torque, and the sixth torque is torque that is in the at least one second available torque range and that has a smallest difference from the second torque.

In a possible implementation, if a difference between an actual yawing angular velocity and a target yawing angular velocity is greater than or equal to a third preset threshold, the processor 91 adjusts, based on current required torque, the fifth torque output by the first power drive system and the sixth torque output by the second power drive system, so that under seventh torque output by the first power drive system and eighth torque output by the second power drive system, a difference between an actual yawing angular velocity and a target yawing angular velocity is less than the third preset threshold.

It should be noted and understood that division of the modules of the foregoing apparatus is merely logic function division. During an actual implementation, some or all modules may be integrated into one physical entity, or the modules may be physically separated. In addition, all these modules may be implemented in a form of software invoked by a processing element, or may be implemented in a form of hardware. Alternatively, some modules may be implemented in a form of software invoked by a processing element, and some modules are implemented in a form of hardware. For example, a determining module may be an independently disposed processing element, or may be integrated in a chip of the foregoing apparatus for implementation. In addition, the determining module may alternatively be stored in a memory of the foregoing apparatus in a form of program code and invoked by a processing element of the foregoing apparatus to perform a function of the determining module. An implementation of another module is similar to the implementation of the determining module. In addition, all or some of these modules may be integrated together, or may be implemented independently. The processing element described herein may be an integrated circuit, and has a signal processing capability. In an implementation process, steps in the foregoing methods or the foregoing modules may be implemented by using a hardware integrated logical circuit in the processing element, or by using instructions in a form of software.

For example, the foregoing modules may be configured as one or more integrated circuits for implementing the foregoing methods, such as one or more application-specific integrated circuits (ASIC), one or more microprocessors (DSP), or one or more field programmable gate arrays (FPGA). For another example, when one of the foregoing modules is implemented in a form of scheduling program code by a processing element, the processing element may be a general purpose processor, for example, a central processing unit (CPU) or another processor that can invoke the program code. For another example, these modules may be integrated together, and implemented in a form of a system-on-a-chip (SOC).

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to the embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

The system bus mentioned in FIG. 9 may be a peripheral component interconnect (PCI) bus, an extended industry standard architecture (EISA) bus, or the like. The system bus may be classified into an address bus, a data bus, a control bus, and the like. For ease of representation, only one thick line is used to represent the bus in the figure, but this does not mean that there is only one bus or only one type of bus. The communications interface is configured to implement communication between a database access apparatus and another device (such as a client, a read/write database, or a read-only database). The memory may include a random access memory (RAM), or may further include a non-volatile memory, for example, at least one magnetic disk memory.

The processor may be a general purpose processor including a central processing unit CPU, a network processor (NP), or the like; or may be a digital signal processor (DSP), an application-specific integrated circuit (ASIC), a field programmable gate array (FPGA) or another programmable logic device, a discrete gate or a transistor logic device, or a discrete hardware component.

An embodiment of this application further provides a vehicle. For a schematic diagram of a system architecture of the vehicle, refer to FIG. 1. To be specific, the vehicle may include a first power drive system, a second power drive system, and a vehicle controller. The vehicle controller may be the vehicle controller shown in FIG. 9.

In one embodiment, an embodiment of this application further provides a storage medium. The storage medium stores instructions, and when the instructions are run on a computer, the computer is enabled to perform the methods in the embodiments shown in FIG. 1 to FIG. 6.

In one embodiment, an embodiment of this application further provides a chip for running instructions. The chip is configured to perform the methods in the embodiments shown in FIG. 1 to FIG. 6.

An embodiment of this application further provides a program product. The program product includes a computer program, the computer program is stored in a storage medium, and at least one processor may read the computer program from the storage medium. When executing the computer program, the at least one processor may implement the methods in the embodiments shown in FIG. 1 to FIG. 6.

In the embodiments of this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists. A and B may be singular or plural. The character "/" generally indicates an "or" relationship between the associated objects. In a formula, the character "/" indicates a "division" relationship between the associated objects. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural.

It may be understood that various numbers in the embodiments of this application are merely used for differentiation for ease of description, and are not used to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

What is claimed is:

1. A vehicle torque processing method, comprising:
allocating torque to a first power drive system and a second power drive system based on required torque, wherein a sum of first torque output by the first power drive system and second torque output by the second power drive system is equal to the required torque;
adjusting, based on the required torque and peak torque of the second power drive system, the first torque output by the first power drive system and the second torque output by the second power drive system when an intrinsic frequency of the first power drive system is in a resonance frequency range corresponding to the first power drive system at a current vehicle speed, wherein adjusted torque output by the first power drive system is third torque, and adjusted torque output by the second power drive system is fourth torque, and wherein the fourth torque is less than or equal to the peak torque of the second power drive system, the third torque is less than the first torque, and the fourth torque is greater than the second torque; and
when a difference between an actual yawing angular velocity and a target yawing angular velocity is greater than or equal to a third preset threshold, adjusting, based on current required torque, third torque output by the first power drive system and fourth torque output by the second power drive system, so that under seventh torque output by the first power drive system and eighth torque output by the second power drive system, the difference between the actual yawing angular velocity and the target yawing angular velocity is less than the third preset threshold.

2. The method according to claim 1, wherein a sum of the third torque and the fourth torque is less than or equal to the required torque.

3. The method according to claim 1, wherein the adjusting the first torque output by the first power drive system and the second torque output by the second power drive system comprises:
when the required torque is less than the peak torque of the second power drive system, third torque output by the first power drive system is equal to zero, and fourth torque output by the second power drive system is equal to the required torque.

4. The method according to claim 1, wherein the adjusting the first torque output by the first power drive system and the second torque output by the second power drive system comprises:
when the required torque is greater than or equal to the peak torque of the second power drive system, fourth torque output by the second power drive system is equal to the peak torque of the second power drive system, and third torque output by the first power drive system is equal to a difference obtained by subtracting the peak torque from the required torque.

5. The method according to claim 1, further comprising:
determining the intrinsic frequency of the first power drive system based on a current rotational speed corresponding to the current vehicle speed and a preset eigenvalue coefficient of the first power drive system.

6. A vehicle controller, comprising:
a memory storing programming instructions; and
a processor coupled to the memory, wherein the processor, upon executing the programming instructions stored in the memory, is configured to
allocate torque to the first power drive system and a second power drive system based on required torque, wherein a sum of first torque output by the first power drive system and second torque output by the second power drive system is equal to the required torque,
adjust, based on the required torque and peak torque of the second power drive system, the torque output by the first power drive system and the torque output by the second power drive system when an intrinsic frequency of the first power drive system is a frequency in a resonance frequency range corresponding to the first power drive system at a current vehicle speed, wherein adjusted torque output by the first power drive system is third torque, and adjusted torque output by the second power drive system is fourth torque, and wherein the fourth torque is less than or equal to the peak torque of the second power drive system, the third torque is less than the first torque, and the fourth torque is greater than the second torque; and
when a difference between an actual yawing angular velocity and a target yawing angular velocity is greater than or equal to a third preset threshold, adjust, based on current required torque, third torque output by the first power drive system and fourth torque output by the second power drive system, so that under seventh torque output by the first power drive system and eighth torque output by the second power drive system, the difference between the actual yawing angular velocity and the target yawing angular velocity is less than the third preset threshold.

7. The vehicle controller according to claim 6, wherein a sum of the third torque and the fourth torque is less than or equal to the required torque.

8. The vehicle controller according to claim 6, wherein the processor is further configured to:
when the required torque is less than the peak torque of the second power drive system, third torque output by the first power drive system is equal to zero, and fourth torque output by the second power drive system is equal to the required torque.

9. The vehicle controller according to claim 6, wherein the processor is further configured to:
when the required torque is greater than or equal to the peak torque of the second power drive system, fourth torque output by the second power drive system is equal to the peak torque of the second power drive system, and third torque output by the first power drive system is equal to a difference obtained by subtracting the peak torque from the required torque.

10. The vehicle controller according to claim 6, wherein the processor is further configured to:
determine the intrinsic frequency of the first power drive system based on a current rotational speed corresponding to the current vehicle speed and a preset eigenvalue coefficient of the first power drive system.

11. A non-transitory computer-readable storage medium storing programming instructions, that when executed by one or more processors, cause an apparatus to:
allocating torque to a first power drive system and a second power drive system based on required torque, wherein a sum of first torque output by the first power drive system and second torque output by the second power drive system is equal to the required torque;
adjusting, based on the required torque and peak torque of the second power drive system, the first torque output by the first power drive system and the second torque output by the second power drive system when an intrinsic frequency of the first power drive system is in a resonance frequency range corresponding to the first power drive system at a current vehicle speed, wherein adjusted torque output by the first power drive system is third torque, and adjusted torque output by the second power drive system is fourth torque, and wherein the fourth torque is less than or equal to the peak torque of the second power drive system, the third torque is less than the first torque, and the fourth torque is greater than the second torque; and
when a difference between an actual yawing angular velocity and a target yawing angular velocity is greater than or equal to a third preset threshold, adjust, based on current required torque, third torque output by the first power drive system and fourth torque output by the second power drive system, so that under seventh torque output by the first power drive system and eighth torque output by the second power drive system, the difference between the actual yawing angular velocity and the target yawing angular velocity is less than the third preset threshold.

* * * * *